United States Patent [19]

Ikeda et al.

[11] Patent Number: 4,876,451
[45] Date of Patent: Oct. 24, 1989

[54] ALUMINUM SOLID ELECTROLYTIC CAPACITOR AND MANUFACTURING METHOD THEREOF

[75] Inventors: Hironosuke Ikeda, Hirakata; Tadashi Ezaki; Kakushiyou Yoshida, both of Saga; Rikizou Yamaguchi, Taku; Kazuhiro Suenaga, Saga, all of Japan

[73] Assignees: Sanyo Electric Co., Ltd., Moriguchi; Saga Sanyo Industry Co., Ltd., Saga, both of Japan

[21] Appl. No.: 228,098

[22] Filed: Aug. 4, 1988

[30] Foreign Application Priority Data

| Aug. 5, 1987 | [JP] | Japan | 62-196130 |
| Aug. 8, 1987 | [JP] | Japan | 62-198938 |
| Nov. 30, 1987 | [JP] | Japan | 62-302797 |
| Dec. 3, 1987 | [JP] | Japan | 62-184767[U] |
| Dec. 14, 1987 | [JP] | Japan | 62-315755 |
| Dec. 16, 1987 | [JP] | Japan | 62-319322 |

[51] Int. Cl.$^4$ ............................................. H01G 9/06
[52] U.S. Cl. ..................................... 361/540; 29/570.1
[58] Field of Search ........ 29/570.1; 361/433, 537–540; 252/62.2

[56] References Cited

U.S. PATENT DOCUMENTS

| 2,123,713 | 7/1938 | Clark et al. | 361/539 |
| 2,285,136 | 6/1942 | Abendroth | 361/538 |
| 2,756,373 | 7/1956 | Houtz et al. | 29/570.1 X |
| 3,270,254 | 8/1966 | Cohn | 361/433 |
| 3,299,325 | 1/1967 | Wagener et al. | 361/433 |
| 3,551,756 | 12/1970 | Frekko | 361/539 |
| 3,566,203 | 2/1971 | Maguire et al. | 361/540 |
| 4,593,343 | 6/1986 | Ross | 361/433 |
| 4,764,181 | 8/1988 | Nakano et al. | 361/433 X |

FOREIGN PATENT DOCUMENTS

| 15023 | 2/1981 | Japan | 29/570.1 |
| 15024 | 2/1981 | Japan | 29/570.1 |

OTHER PUBLICATIONS

IBM Technical Disclosure Bulletin vol. 9 No. 9 Feb. 1967 p. 1115.

Primary Examiner—Donald A. Griffin
Attorney, Agent, or Firm—Armstrong, Nikaido, Marmelstein Kubovcik & Murray

[57] ABSTRACT

An aluminum foil type solid electrolytic capacitor wherein the distance between the two foils in the capacitor element to be determined by the thickness of separator being kept at a value between ten to sixty micrometers, solid electrolyte being formed between the two foils by the thermal decomposition of electrolytic solution impregnated in the capacitor element.

Manufacturing methods of making an aluminum foil type solid electrolytic capacitor with a manganese dioxide electrolytic layer between the electrode foils, wherein the layer is formed by decomposing the electrolytic solution thermally under conditions of a temperature between 200 and 260° C. and of a time interval between 20 and 40 minutes, wherein the layer is formed by decomposing electrolytic solution with fine powders of manganese dioxide, wherein lithium is doped in the layer or wherein electrochemical conversion processes are used for restoring an aluminum oxide film.

Manufacturing methods of making a chip type aluminum solid electrolytic capacitor, wherein a capacitor element is fixed in a case with resin around the center of the case or wherein one lead of a capacitor element is connected electrically to a metallic case into which the capacitor element is inserted.

31 Claims, 11 Drawing Sheets

ALUMINUM SOLID ELECTROLYTIC CAPACITOR AND MANUFACTURING METHOD THEREOF

BACKGROUND OF THE INVENTION

1. Field of the Invention

The present invention relates to an aluminum solid electrolytic capacitor and a manufacturing method thereof.

2. Description of the Prior Art

A conventional solid electrolytic capacitor is manufactured by sintering fine powders (of the order of ten to one hundred micrometers) of aluminum or the like to form a column or a plate, by forming an oxide film on the surface of the sintered body by anode oxidation in an electrochemical conversion solution containing a weak acid as main component, and by forming manganese dioxide (solid electrolyte) on the oxide film by thermal decomposition of manganese nitrate. However, the solid electrolytic capacitor of this type is not of a winding type, and, therefore, it is difficult to manufacture a capacitor of a large capacitance. In order to manufacture a capacitor of a larger capacitance, the size of a capacitor is required to become larger and its cost is not profitable.

Another type of solid dry electrolytic capacitor is proposed wherein aluminum or tantalum foils forming anode and cathode of a capacitor, which have been etched and treated for electrochemical conversion, are wound to form a capacitor element with a separating paper inserted between them and manganese dioxide formed on the foils, for example, by thermal decomposition of manganese nitrate solution immersed into the element (refer to Japanese Patent Publication No. 33-5177). The impedence characteristic of the capacitor of this type is not good especially in a frequency range higher than 500 kHz and the size thereof becomes larger inevitably. This makes practical use of the capacitor of this type difficult.

SUMMARY OF THE INVENTION

It is an object of the present invention to provide an aluminum solid electrolytic capacitor having a good impendance characteristic at high frequencies.

It is another object of the present invention to provide an aluminum solid electrolytic capacitor capable of reducing a leak current.

It is still another object of the present invention to provide a manufacturing method of an aluminum solid electrolytic capacitor having a good impendance characteristic at high frequencies.

It is a further object of the present invention to provide a manufacturing method of an aluminum solid electrolytic capacitor having a high moisture resistance.

It is a still further object of the present invention to provide a manufacturing method of a chip-type aluminum solid electrolytic capacitor having high good workability and productivity.

In order to accomplish these objects, there is provided an aluminum solid electrolytic capacitor according to the present invention, comprising an anode aluminum foil having an oxide film formed on a surface thereof, a cathode aluminum foil and separators for separating said anode and cathode aluminum foils, the two foils and the separators being wound to form a capacitor element, the distance between the two foils in the capacitor element to be determined by the thickness of separator being kept at a value between ten to sixty micrometers, solid electrolyte being formed between the two foils by the thermal decomposition of electrolytic solution impregnated in the capacitor element.

According to the present invention, there is also provided a manufacturing method of aluminum solid electrolytic capacitor comprising steps of: (a) winding an anode aluminum foil and a cathode aluminum foil together with separators for separating said anode and cathode aluminum foils to form a capacitor element, (b) impregnating electrolytic solution of manganese nitrate in the capacitor element, and (c) forming a solid electrolytic layer of manganese dioxide between the electrode foils by decomposing the electrolytic solution thermally under conditions of temperature between 200° and 260° C. and of time between 20 and 40 minutes.

According to the present invention, there is provided another manufacturing method of aluminum solid electrolytic capacitor, comprising the steps of: (a) winding an anode aluminum foil and a cathode aluminum foil together with separators for separating said anode and cathode aluminum foils to form a capacitor element, (b) impregnating electrolytic solution of manganese nitrate in the capacitor element in which fine powder of manganese dioxide is added, and (c) forming a solid electrolytic layer between the electrode foils by decompositing the electrolytic solution thermally.

According to the present invention, there is provided one more manufacturing method of aluminum solid electrolytic capacitor comprising the steps of: (a) winding an anode aluminum foil, a cathode aluminum foil together with separators for separating said anode and cathode aluminum foils to form a capacitor element while keeping the distance between said aluminum foils at a value between ten to sixty micrometers, (b) impregnating electrolytic solution of manganese nitrate in the capacitor element, (c) forming a solid electrolytic layer between said aluminum foils by decomposing the impregnated electrolytic solution thermally, and (d) doping lithium in said solid electrolytic layer.

According to the present invention, there is provided a further manufacturing method of aluminum solid electrolytic capacitor comprising the steps of: (a) winding an anode aluminum foil and a cathode aluminum foil together with separators for separating said anode and cathode aluminum foils to form a capacitor element, (b) impregnating electrolytic solution of manganese nitrate in the capacitor element, (c) forming a solid electrolytic layer of manganese dioxide between the electrode foils by decompositing the electrolytic solution thermally, (d) performing electrochemical conversion treatment again in a weak acidic solution for restoring the deterioration of the oxide film on the aluminum foil before the completion of forming solid electrolyte, and (e) forming again a manganese dioxide layer by impregnating manganese nitrate solution in the capacitor element in which carbon powder is added, and (f) baking carbon on the solid electrolytic layer after impregnating carbon powder added in manganese nitrate solution of an amount much larger than that of the step of forming the manganese dioxide layer again.

According to the present invention, there is provided a still further manufacturing method of aluminum solid electrolytic capacitor, comprising the steps of: (a) winding an anode aluminum foil, a cathode aluminum foil together with separators for separating said anode and cathode aluminum foils to form a capacitor element, (b)

forming a solid electrolytic layer between the electrode foils by decomposing the electrolytic solution thermally, (c) putting an amount of resin for fixing the capacitor element at the bottom of a case having an opening, (d) inserting the capacitor element in the case, (e) fixing the capacitor element to the case with the resin, and (f) sealing the opening of the case, with another amount of the same resin used for fixing.

According to the present invention, there is provided a further manufacturing method of aluminum solid electrolytic capacitor, comprising the steps of: (a) winding an anode aluminum foil and a cathode aluminum foil together with separators for separating said anode and cathode aluminum foils to form a capacitor element, each of said aluminum foils having been bonded with a lead, (b) forming a solid electrolytic layer between said aluminum foils, (c) putting the capacitor element in a metallic case having an opening, (d) connecting one of the leads electrically with the inside surface of the metallic case with use of a binder, and (e) sealing the opening of the metallic case with insulating resin.

BRIEF DESCRIPTION OF THE DRAWINGS

Further objects and advantages of the present invention will be apparent from the following description referring to the accompanying drawings wherein preferred embodiments of the present invention are clearly shown.

In the drawings.

DETAILED DESCRIPTION OF THE PREFERRED EMBODIMENTS

Figure 1:
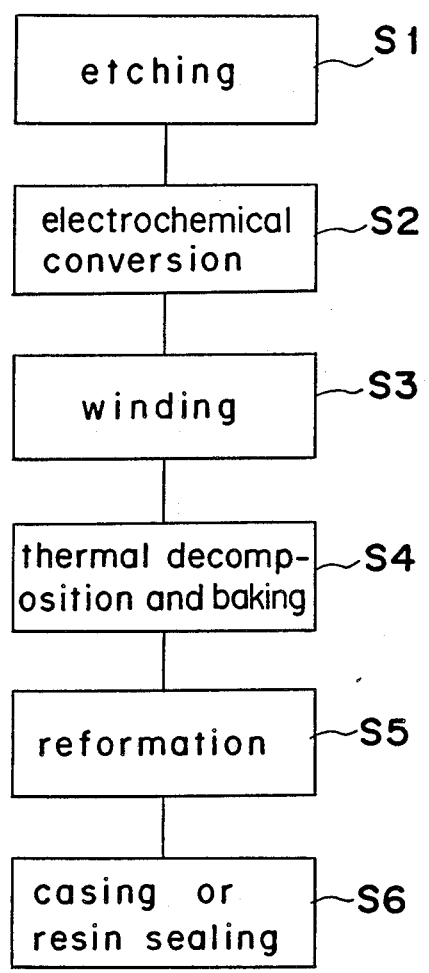
FIG. 1 is a flow chart for showing steps of manufacturing a capacitor according to the first preferred embodiment of the present invention.
Figure 2:
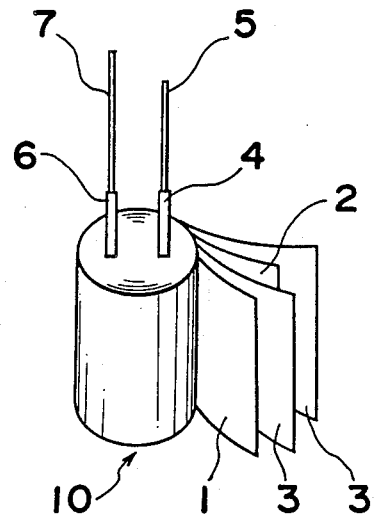
FIG. 2 is a perspective view of an aluminum solid electrolytic capacitor according to the present invention.

Referring now to the drawings wherein like reference numerals designate corresponding parts throughout the drawings, FIG. 1 shows a flow chart of a manufacturing method of an aluminum solid electrolytic capacitor according to the first preferred embodiment of the present invention while FIG. 2 shows a structure of the capacitor element 10 manufactured according to the first preferred embodiment.

First, aluminum foils 1 and 2 of high purity (99.99% or more) are subjected to etching treatment for graving them electrochemically in order to increase the effective surface area in the etching step S1. Next, oxide films (thin films of aluminum oxide) 1a are formed on both of surfaces of one aluminum film, by treating electrochemically in an electrolyte (electrochemical conversion treatment) in the second step S2. The aluminum foil 1 having been subjected to the etching and the electrochemical conversion treatment, is used as an anode foil 1, while another foil 2, having only been etched, is used as a cathode foil 2 arranged opposed to the anode foil 1, and two sheets of Manila papers as separators 3 are put between both foils 1 and 2 and on the other surface of the cathode foil 2, respectively. Then, stacked foils 1 and 2 and separators 3 are wound cylindrically to form a capacitor element 10 in the winding step S3 as shown in FIG. 2. Reference numerals 4, 6 and 5, 7 designate aluminum leads and lead wires connected to the leads 4, 6, respectively. The aluminum leads 4, 6 are connected to the foils 1, 2 after the electrochemical conversion treatment, respectively.

Figure 3A:
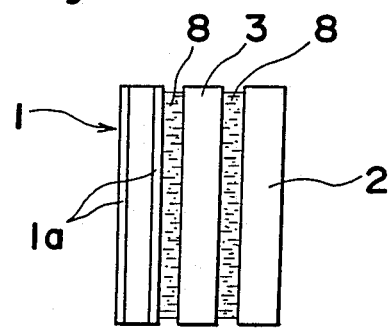
FIGS. 3(a) and 3(b) are enlarged schematic sectional views of a part of a capacitor element after the impregnation process and after the baking process, respectively.
Figure 3B:
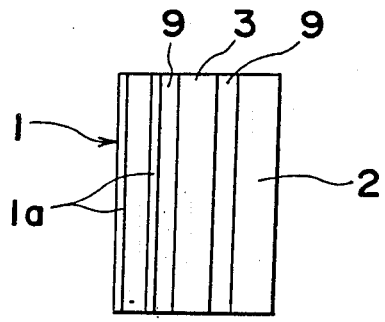

Next, the capacitor element 10 thus formed is subjected to impregnation treatment with use of manganese nitrate solution 8, as shown schematically in FIG. 3(a). The manganese nitrate solution 8 at both sides of the separators 3 are connected to each other through the separators 3. Then, the capacitor element 10 is heated in air to deposit manganese dioxide layers 9 of solid electrolyte by decomposing the manganese nitrate thermally, as shown schematically in FIG. 3(b). The impregnation and thermal decomposition processes are repeated several times to form dense manganese dioxide layers 9 in this step S4. The manganese dioxide layers 9 at both sides of the Manila papers 3 are connected to each other through the separators 3. Further, graphite (carbon) powder dispersed in manganese nitrate solution is impregnated in a space between the manganese dioxide layer 9 and the cathode foil 2, and a carbon layer (not shown) is baked on the electrolytic layer. Next, in order to restore the thermal deterioration of the oxide film caused upon thermal decomposition for forming the manganese dioxide layer 9, an electrochemical treatment in an electrolytic solution, namely a reformation is performed in the fifth step S5. The reformation treatment enables the leak current to decrease remarkably. The capacitor element 10 produced in this way is molded with resin, or is installed in a metal case of aluminum or the like or in a resin case and is sealed with a sealant such as epoxy resin to complete the element as a capacitor in the sixth step S6.

In the structure of this capacitor, the separators 3 prevent mechanical contact of the anode foil 1 with the cathode one 2 and separate both foils at a constant distance in order to prevent short circuit between them and to guarantee high voltage proof. Further, the inventors of the present invention found that the thickness of the separator 3 affects greatly the formation of the manganese dioxide layer which plays the role of a cathode substantially. The present invention is intended to improve the impedance characteristic by setting the distance between the foils 1 and 2 to be determined by the thickness of the separator 3 suitably on the basis of this fact.

Figure 4:
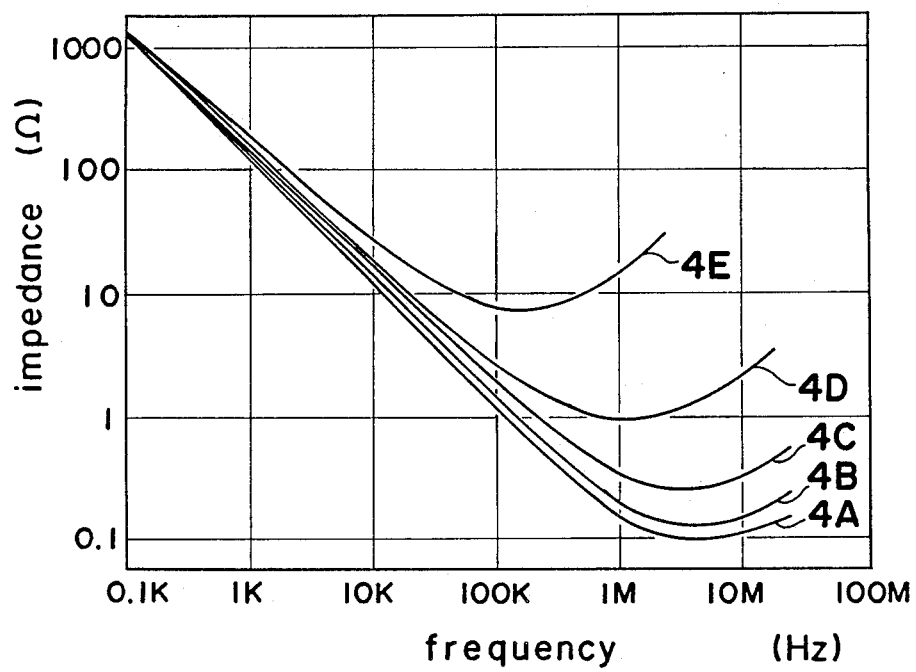
FIG. 4 is a graph showing the frequency characteristic of impedance of capacitors manufactured according to the first preferred embodiment of the present invention.

FIG. 4 shows the frequency characteristic of impedence of aluminum solid electrolytic capacitors which are manufactured according to the first preferred embodiment so as to have an electrostatic capacitance of 1 $\mu$F and a rating voltage of 16 V as a function of the thickness of the separator. In FIG. 4, curves 4A, 4B, 4C, 4D and 4E correspond to capacitors having the thicknesses of the separator of 10, 30, 50, 60 and 100 $\mu$m, respectively. As is apparent from FIG. 4, the frequency characteristic of impedance becomes better with decrease in the thickness of the separator. However, the capacitor of the thickness of the separator of 100 $\mu$m has a too high impedance to be used practically because it is higher than 10 $\Omega$ at 1 MHz. On the contrary, the other capacitors having the thicknesses of the separator up to 60 $\mu$m have the impedances lower than 1 $\Omega$ at 1 MHz so that they are suitable for practical use.

Figure 5:
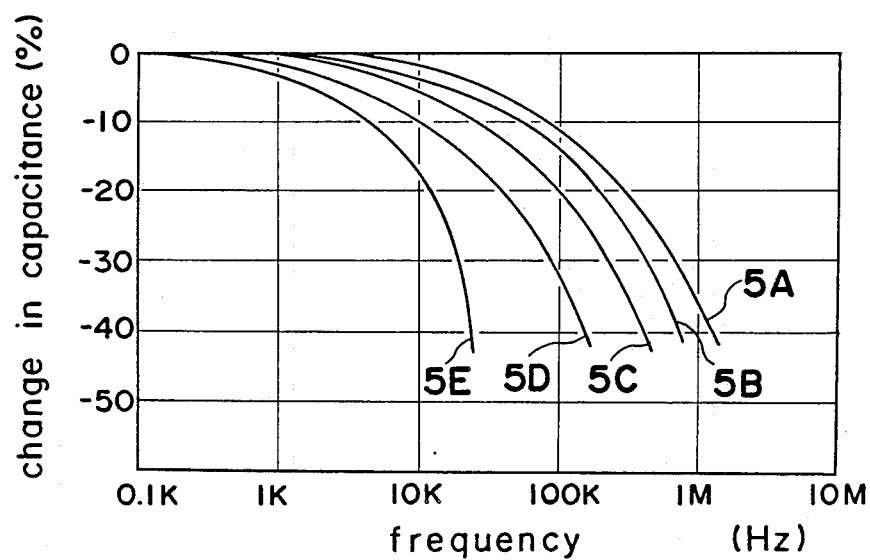
FIG. 5 is a graph showing the change in capacitance plotted against frequency, of capacitors according to the first preferred embodiment of the present invention.

FIG. 5 shows the frequency characteristic of a ratio of change in the electrostatic capacitance to that at 0.1 kHz of aluminum solid electrolytic capacitors, each having a capacitance of 1 $\mu$F and a rating voltage of 16 V, as a function of the thickness of separator, wherein curves 5A to 5E correspond to capacitors having the thicknesses of separator of 10, 30, 50, 60 and 100 $\mu$m, respectively. As is apparent from FIG. 5, the frequency characteristic of the ratio of change in the electrostatic capacitance is kept good up to a higher frequency with decrease in the thickness of separator. However, as for the capacitor of the thickness of separator of 100 $\mu$m, the ratio of electrostatic capacitance begins to increase rapidly around 10 kHz, so that the capacitor is difficult to be used practically. On the contrary, the other capacitors of the thicknesses of separator up to 60 $\mu$m have curves of the change in ratio in electrostatic capacitance which increase rather gradually so that they can be used practically without any problem.

Figure 6:
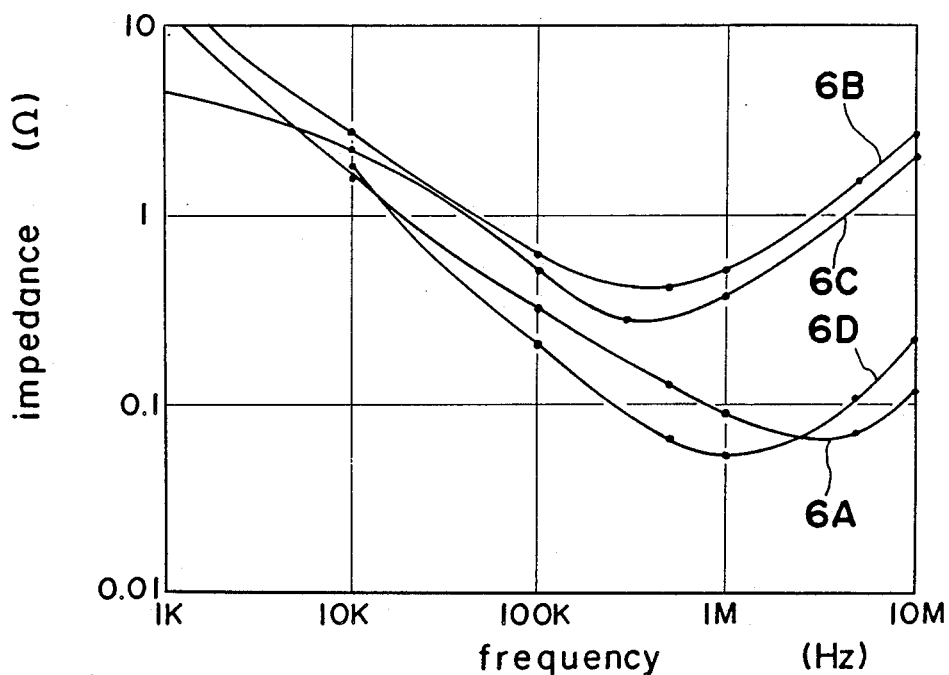
FIG. 6 is a graph showing the frequency characteristic of impedance of capacitors according to the first preferred embodiment of the present invention.

FIG. 6 shows the impedance characteristic of the aluminum solid electrolytic capacitor manufactured according to the first preferred embodiment of the present invention together with those of conventional capacitors for comparison. In FIG. 6, the curve 6A denotes the impedance characteristic of the aluminum solid electrolytic capacitor according to the present invention having the thickness of separator of 30 $\mu$m (capacitance 10 $\mu$F, rating voltage 16 V), while curves 6B, 6C and 6D denote those of a conventional tantalum capacitor (capacitance 10 $\mu$F, rating voltage 16 V), a conventional aluminum solid electrolytic capacitor (capacitance 10 $\mu$F, rating voltage 16 V) and a conventional solid electrolytic capacitor with use of a TCNQ salt as an organic semiconductor (capacitance 10 $\mu$F, rating voltage 25 V), respectively. It is apparent from FIG. 6 that the aluminum solid electrolytic capacitor according to the first preferred embodiment of the present invention has the impedance characteristic superior to the conventional tantalum capacitor and aluminum solid electrolytic capacitor, especially at high frequencies, and as good as the solid electrolytic capacitor with use of a TCNQ salt as an organic semiconductor.

Table 1 shows a relation between the thickness of the separator and the defective ratio of short circuit measured of aluminum solid electrolytic capacitors (capacitance 1 $\mu$F, rating voltage 16 V) according to the first preferred embodiment of the present invention. The number of samples is fifty for each thickness.

The data compiled in Table 1 shows that the defective ratio of short circuit increases with decrease in the thickness of the separator and the defective ratio becomes as high as 8.26% at 5 $\mu$m, while it is lower than 1% at 10 $\mu$m or more.

By taking into account these data shown in FIGS. 4 to 6 and Table 1, it is desirable to set the thickness of separator which determines the distance between both electrolytic foils at a value in a range defined between 10 and 60 $\mu$m, preferably between 30 and 60 $\mu$m.

TABLE 1

| thickness of separator | defective ratio of short circuit |
|---|---|
| 100 $\mu$m | 0.20% |
| 60 | 0.20 |
| 50 | 0.21 |
| 30 | 0.32 |
| 10 | 0.90 |
| 5 | 8.26 |

As explained above, according to the present invention, the impedance characteristic of the aluminum solid electrolyte capacitor is improved greatly especially at high frequencies without increasing the size thereof, so that is becomes applicable to frequencies from 100 kHz to 10 MHz. Further, because such a capacitor uses manganese dioxide whose cost is as low as about a hundredth of TCNQ salt, the capacitor having the frequency characteristic as good as that of a conventional solid electrolytic capacitor which uses the organic semiconductor can be manufactured at a low cost.

Figure 7:
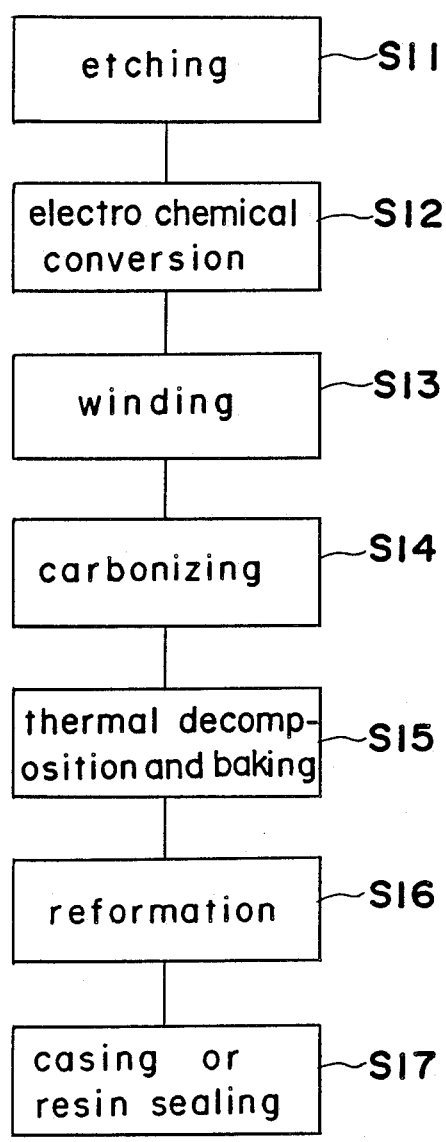
FIG. 7 is a flow chart for showing steps of manufacturing a capacitor according to the second preferred embodiment of the present invention.

FIG. 7 shows a flow chart of a manufacturing method of an aluminum solid electrolytic capacitor according to the second preferred embodiment of the present invention which has improved impedance characteristic of capacitance.

A capacitor element 10 is manufactured in the same way as in the first preferred embodiment. First, aluminum foils of high purity (99.99% or more) are subjected to etching treatment for graving the foils electrochemically in order to increase the effective surface area in the first step S11. Next, oxide films (thin films of aluminum oxide) 1a are formed on the surface of one of the aluminum films electrochemically in an electrolytic solution (electrochemical conversion treatment) in the second step S12. Then, the aluminum foil 1 which has been subjected to the etching and the electrochemical conversion treatment is used as an anode foil 1 while another foil 2 which has only been etched is used as a cathode foil 2 arranged opposed to the anode foil 1, and two sheets of Manila paper as separators 3 are put between foils 1 and, 2. Then, stacked foils 1 and 2 and separators 3 are wound cylindrically as shown in FIG. 2 to form a capacitor element 10 in the third step S13.

Next, the capacitor element 10 is subjected to thermal treatment to carbonize Manila papers as separators 3' to lower the density by making the filaments thinner (step S14). In the heat treatment, the temperature between 150° and 300 ° C. and the time between 10 and 40 minutes are suitable. Due to this treatment, the amount of manganese nitrate to be impregnated into the capacitor element can be increased and, therefore the characteristics of the capacitor are improved.

Figure 8A:
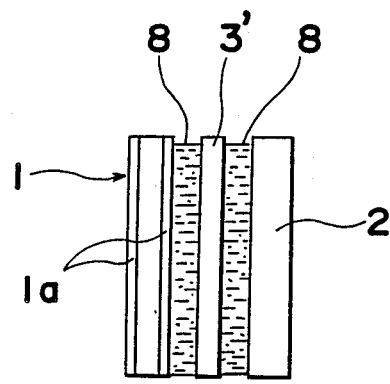
FIGS. 8(a) and 8(b) are enlarged schematic sectional views of a part of a capacitor element after the impregnation process and after the baking process, respectively.
Figure 8B:
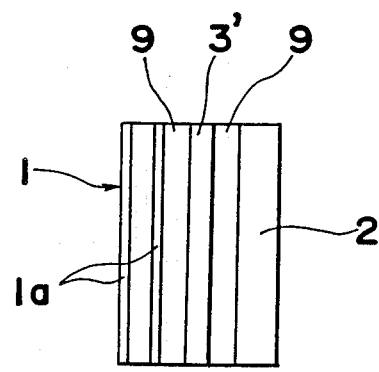

Next, the capacitor element 10 thus formed is subjected to an impregnation treatment with manganese nitrate solution 8, as shown schematically in FIG. 8(a). The manganese dioxide solutions 8 at both sides of the separators 3' are connected to each other through the separators 3'. Then, the capacitor element 10 is heated in air to deposit a manganese dioxide layer 9 of solid electrolyte by decomposing manganese nitrate thermally, as shown schematically in FIG. 8(b). The manganese dioxide layers 9 at both sides of the separators are connected to each other through the separators 3'. The impregnation and thermal decomposition step S15 is repeated several times to form a dense manganese dioxide layer 9. Further, graphite (carbon) powder dispersed in manganese nitrate solution is impregnated in a space between the manganese dioxide layer 9 and the cathode foil 2, and a carbon layer (not shown) is baked on the electrolytic layer. Next, in order to restore thermal deterioration of the manganese dioxide layer 9 caused upon the thermal decomposition for forming the manganese dioxide layer, an electrochemical treatment in an electrolyte solution, namely reformation is performed in the sixth step S16. The reformation treatment enables the leak current to reduce remarkably. An element 10 produced in this way is molded with a resin, or is installed in a metal case of aluminum or the like or in a resin case to be sealed with a sealant such as epoxy resin to finish the element as a capacitor (step S17).

In the manufacturing method of an aluminum solid electrolytic capacitor, the thermal decomposition conditions of manganese nitrate affect greatly the formation of the manganese dioxide layer. If the temperature of thermal decomposition is too low, the thermal decomposition of manganese nitrate proceeds efficiently to invite a so called "underdecomposed" state, whereas if the temperature is too high, the manganese nitrate is decomposed too much and this invites a so called "overdecomposed" state. On the other hand, if the time for thermal decomposition is too short, the manganese nitrate remains in the underdecomposed state whereas if the time is too long, it becomes in the "overdecomposed" state. In such an underdecomposed or overdecomposed state, the manganese dioxide layer as solid electrolyte cannot be produced enough so that the characteristic of a capacitor such as tan $\delta$ or impedance is deteriorated.

Table 2 shows a relation between the conditions of thermal decomposition and the characteristics of the aluminum solid electrolytic capacitor having a capacitance 10 $\mu$F and rating voltage 16V. The number of samples is fifty for each test. The temperature is varied within a range between 180° and 280 ° C. and the decomposition time is varied within a range between 10 and 50 minutes. In Table 2, tan $\delta$ and impedance denote values measured at 1 kHz and at 100 kHz, respectively. The evaluation is derived from both of tan $\delta$ and the impedance together, that is, the evaluation is good (O) if tan $\delta$ is less than 0.04 and the impedance is less than 0.4 $\Omega$, not so good ($\Delta$) if tan $\delta$ is between 0.4 and 0.5 $\Omega$, and bad (x) if tan $\delta$ is 0.051 or more and the impedance is 0.51 $\Omega$ or more. Therefore, it is found that the decomposition temperature between 200° and 260 ° C. and the decomposition time between 20 and 40 minutes are considered to be optimum.

TABLE 2

| temp (°C.) | time (min) | tan $\delta$ | impedance ($\Omega$) | Evaluation |
|---|---|---|---|---|
| 180 | 10 | 0.091 | 1.18 | X |
| 180 | 20 | 0.083 | 0.96 | X |
| 180 | 30 | 0.079 | 0.84 | X |
| 180 | 40 | 0.073 | 0.84 | X |
| 180 | 50 | 0.070 | 0.82 | X |
| 200 | 10 | 0.071 | 0.84 | X |
| 200 | 20 | 0.046 | 0.49 | $\Delta$ |
| 200 | 30 | 0.042 | 0.48 | $\Delta$ |
| 200 | 40 | 0.038 | 0.45 | O |
| 200 | 50 | 0.049 | 0.53 | X |
| 220 | 10 | 0.065 | 0.76 | X |
| 220 | 20 | 0.043 | 0.48 | $\Delta$ |
| 220 | 30 | 0.036 | 0.39 | O |
| 220 | 40 | 0.030 | 0.33 | O |
| 220 | 50 | 0.051 | 0.57 | X |
| 240 | 10 | 0.053 | 0.63 | X |
| 240 | 20 | 0.037 | 0.39 | O |
| 240 | 30 | 0.023 | 0.29 | O |
| 240 | 40 | 0.025 | 0.30 | O |
| 240 | 50 | 0.054 | 0.58 | X |
| 260 | 10 | 0.053 | 0.61 | X |
| 260 | 20 | 0.030 | 0.32 | O |
| 260 | 30 | 0.032 | 0.35 | O |
| 260 | 40 | 0.040 | 0.40 | $\Delta$ |
| 260 | 50 | 0.050 | 0.67 | X |
| 280 | 10 | 0.053 | 0.62 | X |
| 280 | 20 | 0.057 | 0.67 | X |
| 280 | 30 | 0.061 | 0.70 | X |
| 280 | 40 | 0.064 | 0.79 | X |
| 280 | 50 | 0.072 | 0.91 | X |

Figure 9:
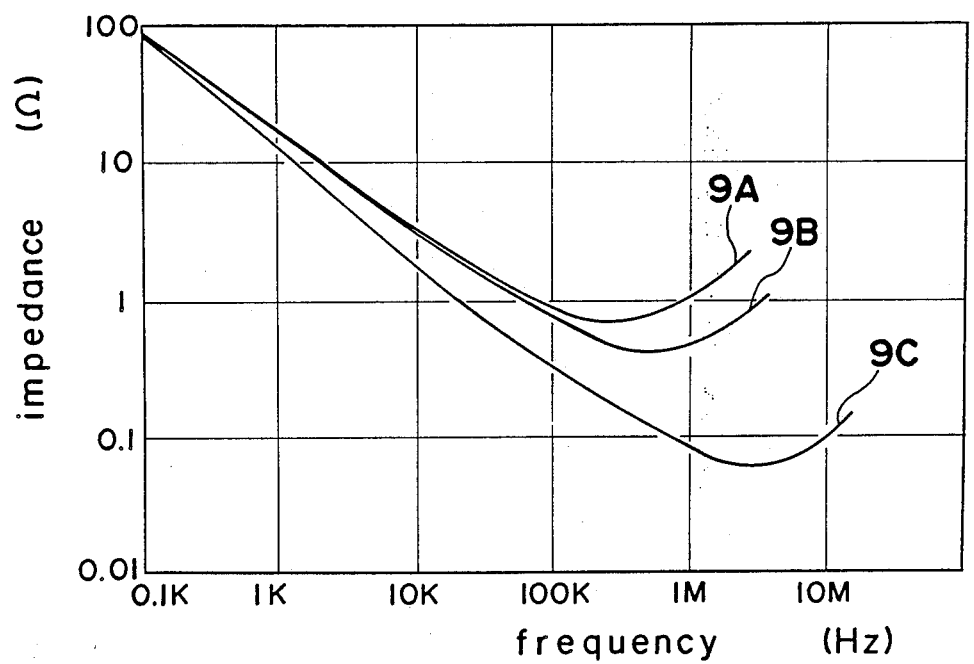
FIG. 9 is a graph showing the frequency characteristic of impedance of capacitors manufactured according to the second preferred embodiment.

FIG. 9 shows the frequency characteristic of impedance obtained under various decomposition conditions. Curves 9A, 9B and 9C correspond to conditions of 180° C., 30 minutes: 280° C., 30 minutes and 240° C., 30 minutes, respectively. The last conditions of 240° C. and 30 minutes give an excellent impedance characteristic.

Figure 10:
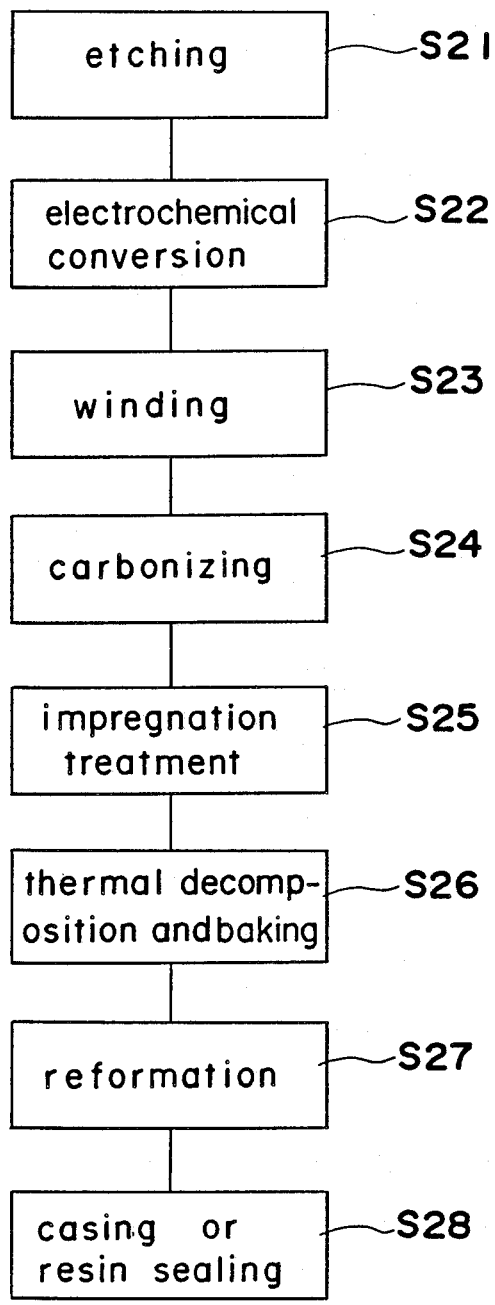
FIG. 10 is a flow chart for showing steps of manufacturing a capacitor according to the third preferred embodiment of the present invention.

FIG. 10 shows a flow chart of a manufacturing method according to the third preferred embodiment of the present invention.

As is apparent from comparison of FIG. 10 with FIG. 7 showing the second preferred embodiment, only difference is that the manganese nitrate solution with fine powder of manganese dioxide (MnO₂) is used upon impregnation thereof (step S25).

Namely, in the third preferred embodiment, fine powder of manganese dioxide is added beforehand into the manganese nitrate solution although manganese dioxide itself is formed by the thermal decomposition of manganese nitrate. The amount of addition of the fine powder of manganese dioxide affects the formation of the manganese dioxide layer greatly.

The other steps S21–S24 and S26–S28 corresponds to the steps S11–S17, respectively (FIG. 7).

Table 3 shows a relation between the amount (weight percent) of fine powder of manganese dioxide and the impedance at 100 kHz, wherein fifty capacitors of rating voltage 16V and capacitance 10° F. are measured for each amount of addition between 0 and 10% for every 2%.

The result shown in Table 3 suggests that the amount addition between about 4 and 6 wt. % is the most favorable for the impedance characteristic.

Figure 11:
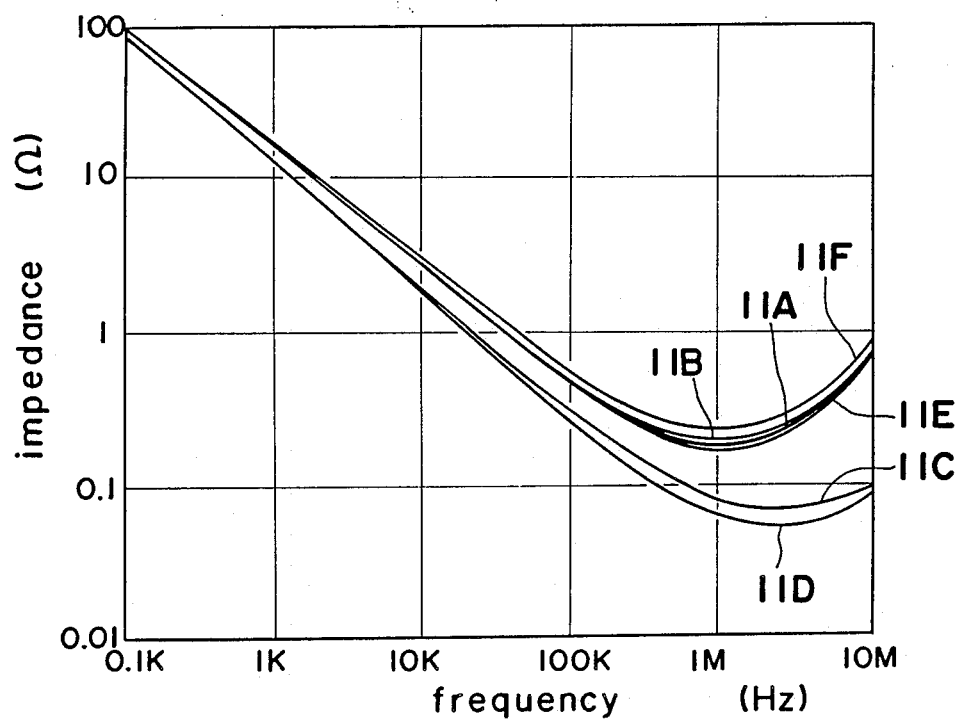
FIG. 11 is a graph showing the frequency characteristic of capacitors manufactured according to the third preferred embodiment of the present invention.

FIG. 11 shows a relation of the frequency characteristic of impedance with the amount of addition of manganese dioxide powder, wherein curves 11A, 11B, 11C, 11D, 11E and 11F correspond to amounts of the addition of 0, 2, 4, 6, 8 and 10% respectively.

TABLE 3

| amount of MnO₂ added | impedance (at 100 kHz) |
|---|---|
| 0% | 0.46 Ω |
| 2% | 0.48 Ω |
| 4% | 0.30 Ω |
| 6% | 0.26 Ω |
| 8% | 0.46 Ω |
| 10% | 0.54 Ω |

FIG. 11 also suggests that the amount of the addition of the fine powder of manganese dioxide is the best in a range defined between about 4 and 6 wt %.

By using fine powder of manganese dioxide of about 4 to 6 wt %, the frequency characteristic of aluminum solid electrolytic capacitor can be improved, especially at high frequencies, without enlarging the size. Further, this process is also favorable for lowering cost because no new steps are required, and can be adopted for practical use.

Figure 12:
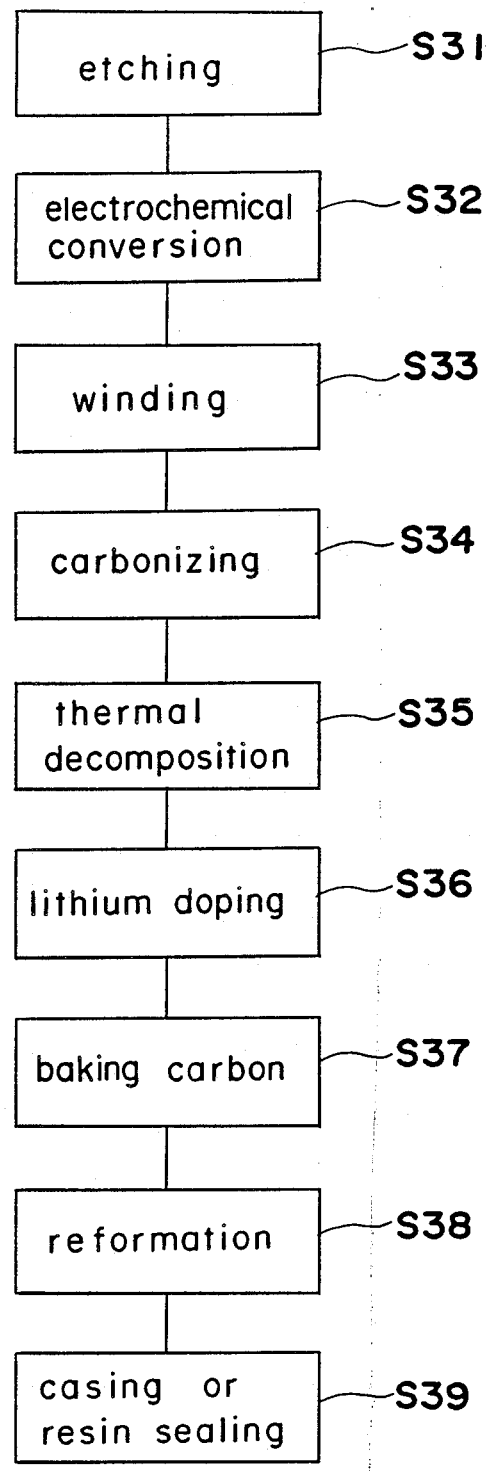
FIG. 12 is a flow chart for showing steps of manufacturing a capacitor according to the fourth preferred embodiment of the present invention.

FIG. 12 shows a flow chart of a manufacturing method of a capacitor according to the fourth preferred embodiment of the present invention.

The fourth preferred embodiment is characterized in that lithium doping step S36 is performed after the thermal decomposition of manganese nitrate impregnated into the capacitor element. Then, a carbon layer is baked in a space between the manganese dioxide layer 9 and the cathode foil 2 (step S37). Other steps S31–S34, S38 and S39 are substantially the same to those S11–S14, S16 and S17 of the second preferred embodiment (FIG. 7).

In this step S36, the capacitor element 10 wherein the manganese dioxide layer has been formed is immersed as an active electrode together with a lithium plate as a counter electrode in a mixed electrolytic solution of lithium chlorate, propylene carbonate and dimethyl ether, and a constant current of 0.1 to 0.3 mA per one element is applied in the electrolytic solution. During this process, Li⁺ ions in the electrolytic solution diffuse into the crystal lattice of manganese dioxide (MnO₂) in the solid state so as to cause the following reaction to reduce quadrivalent Mn to trivalent Mn:

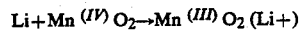

$$Li + Mn^{(IV)}O_2 \rightarrow Mn^{(III)}O_2(Li+)$$

Further, a carbon layer is baked on the electrolytic layer in step S37.

The lithium doping after the formation of manganese dioxide layer 9 in the manufacture of capacitor enhances the electrical conductivity of the manganese dioxide layer and improves the characteristics of the capacitor.

Table 4 shows differences in the characteristics between capacitors manufactured with and without using the lithium doping process. The impedance at 100 kHz and tan δ at 120 kHz are measured of fifty samples of each capacitor having a rating voltage 16 V and capacitance 10 μF, and respective averages are calculated from the measured values.

TABLE 4

| lithium doping | impedance (100 kHz) | tan δ (120 Hz) |
|---|---|---|
| none | 0.46 Ω | 2.6% |
| doping | 0.21 Ω | 1.8% |

As is clear from Table 4, both the impedance and tan δ of the capacitor wherein lithium is doped are improved remarkably more than without doped lithium.

Figure 13:
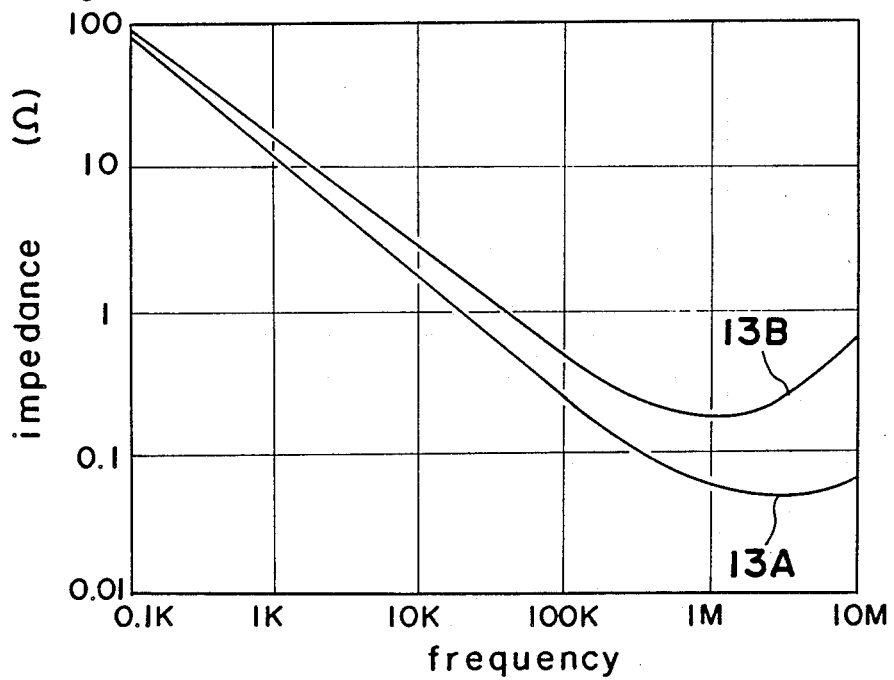
FIG. 13 is a graph showing the frequency characteristic of impedance of capacitors manufactured according to the fourth preferred embodiment of the present invention.

FIG. 13 shows the frequency characteristic of impedance of a capacitor manufactured with use of lithium doping (13A) and of a capacitor manufactured without using lithium doping (13B). FIG. 13 clearly indicates that the impedance characteristic is greatly improved, especially at high frequencies, when manufactured by using the lithium doping process.

As explained above, the lithium doping enhances the electrical conductivity of the manganese dioxide layer, and improves the frequency characteristic of impedance of the capacitor.

Figure 14:
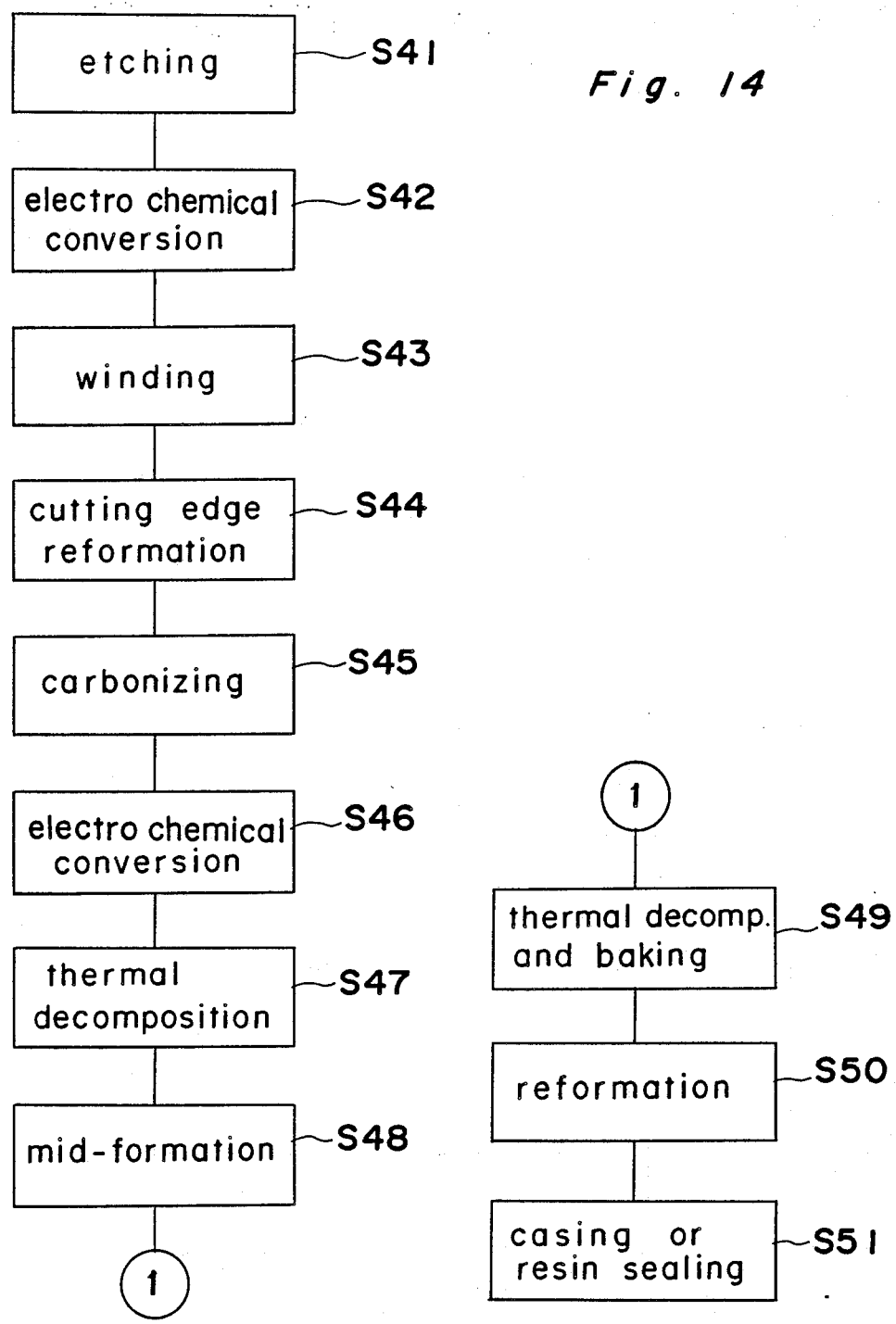
FIG. 14 is a flow chart for showing steps of manufacturing a capacitor according to the fifth preferred embodiment of the present invention.

FIG. 14 shows a flow chart of a manufacturing method of a capacitor according to the fifth preferred embodiment of the present invention.

A capacitor element 10 as shown in FIG. 2 is manufactured through the first to third step S41 to S43 similar to those of the foregoing preferred embodiments.

Next, scratches of aluminum foils and defects of films caused at cutting edges of aluminum foils or the like is restored with electrochemical conversion treatment in a weak acidic electrolytic solution (cutting edge reformation) in the fourth step S44.

Next, the capacitor element 10 is subjected to thermal treatment to carbonize Manila papers as the separators 3' to lower the density by making the filaments thinner in the fifth step S45, under conditions of the temperature between 150° and 300° C. and the time between 10 and 40 minutes.

Then, the capacitor element 10 is subjected to electrochemical conversion treatment (step S46) so as to restore the oxide film which has been deteriorated thermally.

Next, a capacitor element 10 thus formed is subjected to impregnate manganese nitrate solution. Then, the capacitor element 10 is heated in air under conditions, for example, of a temperature between 200° and 260° C. and of a time interval between 20 and 40 minutes so as to decompose thermally the impregnated manganese nitrate to deposit a manganese dioxide layer of solid electrolyte (step S47). The impregnation and thermal decomposition processes are repeated several times to form a dense manganese dioxide layer similarly to the foregoing preferred embodiment. During the manganese dioxide formation process or before the completion of the formation of solid electrolyte made of manganese dioxide, a further electrochemical conversion treatment (mid-formation) (step S48) is performed through the solid electrolytic layer similarly to the electrochemical conversion treatment of step S42. Thus, the thermal deterioration of the oxide film caused by the thermal decomposition is restored.

Next, another thermal decomposition treatment (step S49) is performed with use of manganese nitrate wherein graphite (carbon) powder is added under conditions substantially the same as those of the above-mentioned thermal decomposition, so as to perfect the formation of solid electrolytic layer 9 of manganese dioxide (manganese nitrate thermal decomposition). Further, graphite (carbon) powder of an amount much larger than that used in the manganese nitrate thermal decomposition process, dispersed in manganese nitrate solution, is impregnated in the space between the solid electrolytic layer 9 and the cathode foil 2, and a carbon layer is formed on the solid electrolyte by baking the carbon under conditions substantially the same as the above-mentioned thermal decomposition conditions (carbon layer baking) (step S49). The carbon layer fills the space between the solid electrolyte 9 and the cathode foil 2 so that the contact resistance between them are decreased and the solid electrolytic layer 9 is protected.

Next, in order to restore the thermal deterioration of the oxide film caused upon the foregoing carbon layer baking (step S49), an electrochemical treatment in an electrolytic solution, namely reformation, is performed (step S50).

The capacitor element 10 thus manufactured is molded with resin (resin dip), or is sealed with epoxy resin or the like after being inserted in a metallic case of aluminum or the like or in a resin case (case insersion or resin sealing) (step S51) to form a capacitor.

Table 5 shows a relation between the leak current and the defective ratio of short circuit of various combinations of the cutting edge formation (step S44), midformation (step S48) and reformation (step S49), wherein O and X denote the adoption and the non-adoption of each step, respectively. All of samples used for measurement have a rating voltage of 16V and a capacitance of 10 $\mu$F.

TABLE 5

| No. | cutting edge reformation | mid-formation | reformation | leak current | defective ratio of short circuit |
|---|---|---|---|---|---|
| 1 | X | O | O | 1.0 | 1.0 |
| 2 | X | O | X | 6.0 | 7.0 |
| 3 | X | X | O | 1.8 | 1.0 |
| 4 | X | X | X | 30.0 | 20.0 |
| 5 | O | O | O | 0.3 | 0 |
| 6 | O | O | X | 3.0 | 3.0 |
| 7 | O | X | O | 1.1 | 1.0 |
| 8 | O | X | X | 10 | 13.0 |

The leak current shows an average of fifty samples, while the defective ratio of short circuit denotes a ratio of the samples having a large leak current of an order of mA to 100 samples.

Table 5 shows clearly that both the leak current and the short circuit ratio are improved most when all cutting edge reformation, mid-formation and reformation processes are performed (No. 5). The comparison of cases of No. 5 and No. 7 makes the effect by the mid-formation process clear.

In this preferred embodiment, because the mid-formation treatment (step S48) is performed before the carbon baking treatment and before forming a solid electrolytic layer (step S49), the oxide film deteriorated thermally in the thermal decomposition step S47 can be restored completely without suppressing the electrochemical conversion with the solid electrolyte and carbon layers.

Although the manufacturing methods for a capacitor of winding type are explained in the foregoing preferred embodiments, the present invention is applicable to a chip capacitor (surface mount type capacitor), as will be explained below.

Figure 15A:
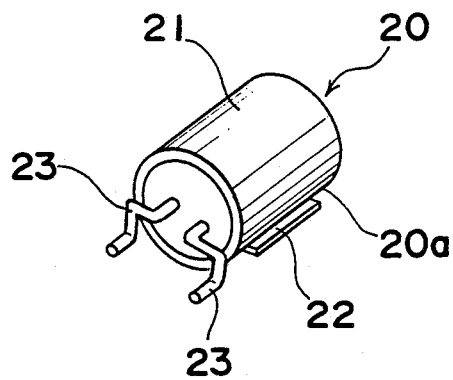
FIGS. 15(a) and 15(b) are perspective views of a chip capacitor according to the present invention, respectively.
Figure 15B:
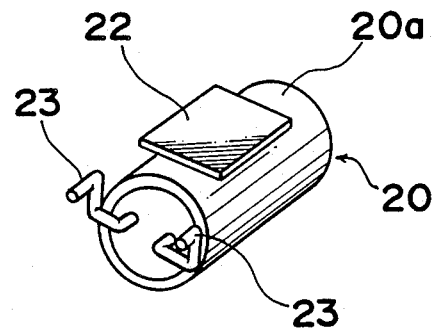

FIGS. 15(a) and 15(b) show a chip capacitor. A cylindrical capacitor 20 with a cylindrical case 21 wherein a capacitor element manufactured according to the present invention is installed. A small rectangular sheet 22 is fixed on the cylindrical surface 20a of the capacitor 20. The sheet 22 is made of fluorine-contained resin, silicon resin, polyimide resin or the like of the size of about 4 mm $\times$ 5 mm with the thickness 0.2 mm, and it is bonded on the surface 20a of the capacitor 20 with a heat resistant binder such as epoxy resin, UV resin or a with a pressure sensitive adhesive double coated tape. Any binder can be used if its position does not move at room temperature while it does not peel on reflow of solder.

The cylindrical capacitor 20 with the sheet 22 can be used as a chip capacitor which can be set in the horizontal direction.

The chip capacitor 20 can be put stably on a print circuit board. Further, the heat resistant sheet 22 can protect the main body of the capacitor 20 from the heat of the print circuit board on soldering. Leads 23 can be bent properly for use as a chip capacitor.

Figure 16:
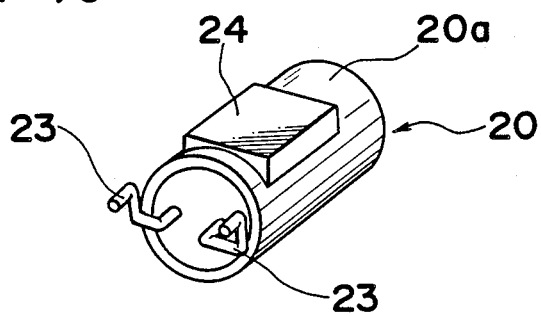
FIG. 16 is a perspective view of another chip capacitor according to the present invention.

FIG. 16 shows a similar type of chip capacitor 20 with a sheet 24 which has a curved inner face along the side 20a. Such a sheet can be produced for example with a formation process. The sheet 24 makes it stable to locate the capacitor on a print circuit board, and prevents possible cracking of the casing tube of the capacitor and deterioration of characteristics due to heat transmitted from the print circuit board. equipped with a first sheet 25 for fixing the capacitor 20 stably on a print circuit board and a second sheet 26 for serving as a plane for absorption upon mounting the capacitor on a print circuit board with use of an absorbing chuck. The second sheet 26 has a similar size of thickness of about 0.2 to 0.3 mm to the first one 25, and is adhered to the capacitor 20 with, for example, quick-drying epoxy resin. By forming a plane for absorption, the absorbing chuck needs not necessarily have an absorbing surface adapted to the curved surface of the chip capacitor. Then, not a special chuck, but an ordinary one, can be used for mounting a chip capacitor, and the chip capacitor of this type needs not discriminate the top and bottom thereof. The second sheet 26 is preferably made of polyvinyl chloride resin, polyimide resin, fluorine-contained resin or the like.

Figure 17A:
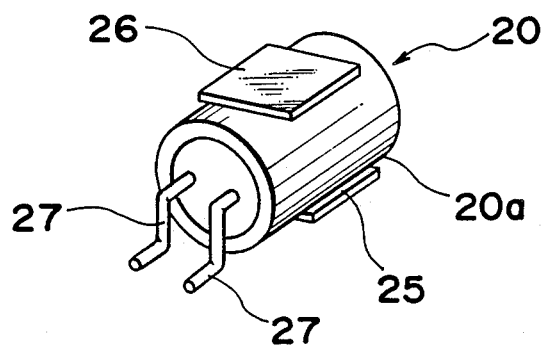
FIGS. 17(a) and 17(b) are perspective view and elevational view of still another chip capacitor according to the present invention, respectively.
Figure 17B:
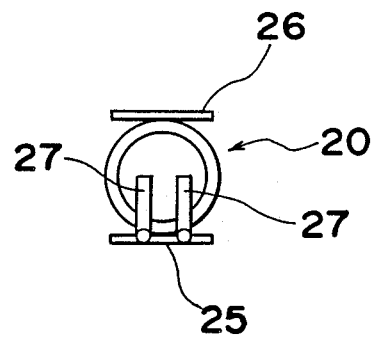
Figure 18A:
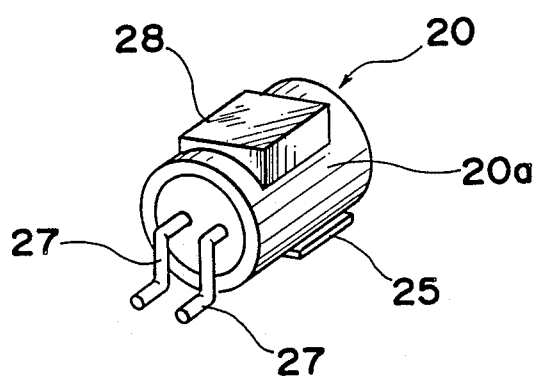
FIGS. 18(a) and 18(b) are perspective and end views of a further chip capacitor according to the present invention, respectively.
Figure 18B:
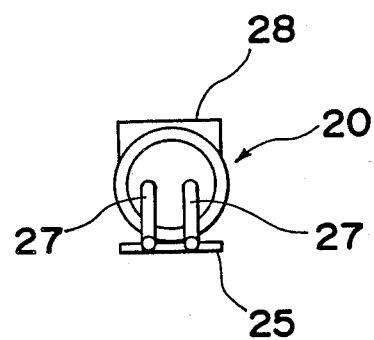

FIGS. 18(a) and 18(b) show a chip capacitor similar to that shown in FIGS. 17(a) and 17(b), except that a second sheet 28 has a curved face along the peripheral side 20a of the capacitor 20. The second sheet 28 with such a curved face can be obtained for example with forming process.

Figure 19A:
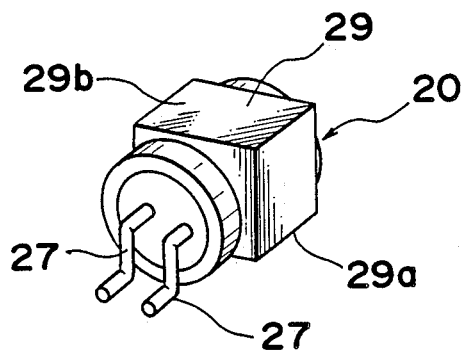
FIGS. 19(a) and 19(b) are perspective and end views of a still further chip capacitor according to the present invention, respectively.
Figure 19B:
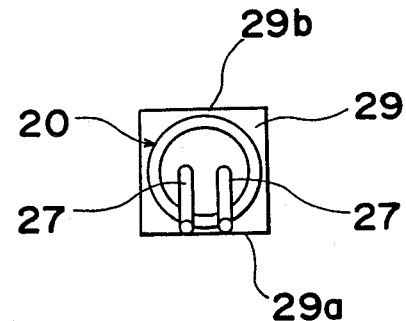

FIGS. 19(a) and 19(b) show a capacitor 20 similar to that shown in FIGS. 17(a) and 17(b), except that a spacer 29 having a lower plane 29a and an upper one 29b is equipped instead of using two sheets 25, 26 of the latter. The capacitor 20 can be put on a print circuit board on a plane 29a, while the other plane 29b serves as an absorbing plane. Because the capacitor 20 has upper and lower planes, it can be mounted with use of an ordinary chip mounter as well as an ordinary chip capacitor having a rectangular cross-section.

Figure 20A:
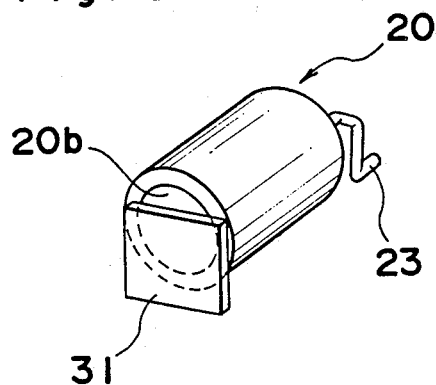
FIGS. 20(a) and 20(b) are perspective and side views of one more chip capacitor according to the present invention, respectively.
Figure 20B:
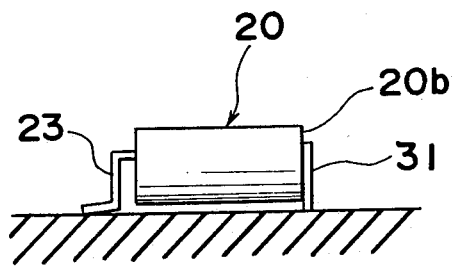

FIGS. 20(a) and 20(b) show a capacitor 20 which has a sheet 31 of a roughly square shape adhered on an end face 20b of the capacitor 20. The sheet 31 is fixed offset to the axis of the capacitor 20 so that the sheet 31 and bent leads 23 can support the main body of the capacitor 20 a little above the surface of a print circuit board. Thus, the capacitor 20 is fixed firmly on the print circuit board with a gap by adhering the lower portion of the sheet 31 thereon.

In the sealing process of the manufacturing method of an aluminum foil type solid electrolytic capacitor such as steps S6, S28, S39 or S51 in FIGS. 1, 10, 12 or 14, a capacitor element such as shown in FIG. 2 is inserted into a case and is sealed with resin. If the filling up of resin for sealing makes the position of the capacitor element deviate from the center, defects such as short circuit are liable to happen. Therefore, it is needed to fix the capacitor element in the case temporarily upon sealing with resin. In the sealing process, a small amount of thermoplastic resin is filled in a case and is melted by heating, and after a capacitor element is installed in the case, the resin is cooled to fix the capacitor element therein. Then, thermoplastic resin is filled up in the case for sealing.

However, this sealing step has following problems. First, this does not take into account moisture resistance of resin for temporary fixing. Therefore, water is liable to penetrate the contact boundary between the resin layer and either the case or the leads and it is absorbed in the capacitor element. Because water acts as an electrolyte, the electrostatic capacitance is increased. Further, two kinds of resin are needed for temporary fixing and for sealing.

Figure 21:
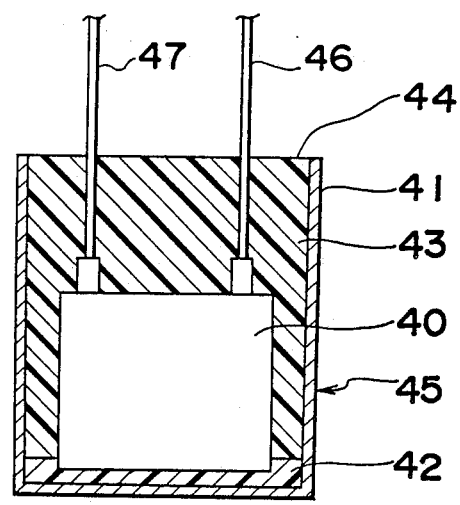
FIG. 21 is a sectional view of a capacitor of another type according to the present invention.

A capacitor element 40 manufactured according to either one of foregoing preferred embodiments is installed in a case 41 made of metal such as aluminum or of resin, as shown in FIG. 21. Thermosetting resin 42 has been put in the case 41 beforehand by about ten percent of the inner volume of the case 41. After the capacitor 40 is installed in the case, the case 41 is heated for hardening the resin 42, for example, at a temperature of 80°-90° C. for ten minutes, so that the capacitor element 40 is fixed temporarily to the case 41. Then, the case 41 is filled up to an opening 44 of the case 41 with thermosetting resin 43 which is of the same kind as the thermosetting resin 42. Next, the case 41 is heated for hardening, for example, at a temperature of 50° to 110° C. for a time interval between six and ten hours.

The heating temperature of the thermosetting resin 43 for sealing the opening 44 of the case 41 is desirable to be as low as possible in order to make it easy to remove resin adhered to the leads 46, 47 in the following rinse process.

As explained above, the same thermosetting resin is used both for fixing a capacitor element in a case and for sealing the opening of the case wherein the capacitor element has been fixed. Therefore, water can be intercepted so as not to penetrate into the capacitor element 40 from external, so that the enhancement of the electrostatic capacitance can be prevented because the capacitor element does not absorb water. Further, because the same resin is used for temporary fixing and for sealing, the manufacturing steps can be shortened.

In this embodiment, the same resin of good moisture resistance is used both for temporary fixing and for sealing of a capacitor element. Therefore, water can be prevented to penetrate there into from the external. Thus, the capacitor element does not absorb water so that the initial characteristics can be maintained.

Conventionally, such a chip capacitor is manufactured by deforming leads of an aluminum solid electrolytic capacitor, welding the leads with metallic terminal plates and molding the capacitor and the welded parts with resin. However, such a welding step requires complicated work so that work efficiency and productivity are low. Further, the resin molding step requires a large-scaled apparatus which becomes a bottle neck for cost down.

Figure 22:
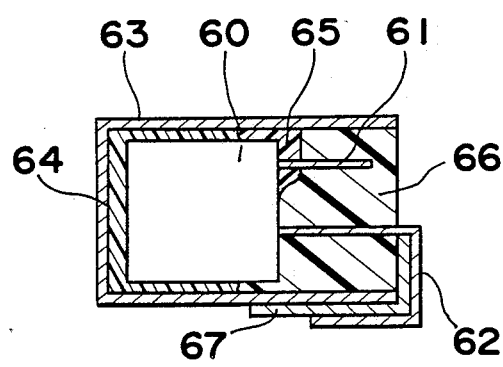
FIGS. 22, 23, 24 and 25 are sectional views of capacitors for showing various connecting method of leads according to the present invention, respectively.
Figure 23:
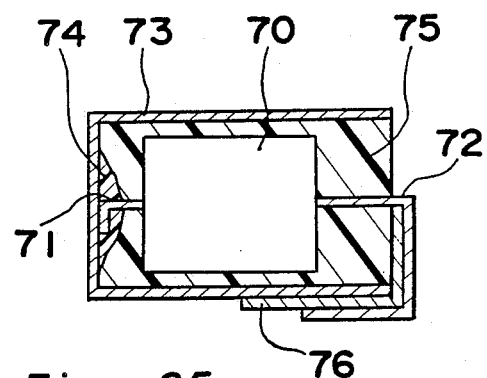

FIGS. 22 and 23 show examples of a chip capacitor according to the present invention which can solve the above-mentioned problems. Capacitor elements 60, 70 are manufactured as a capacitor element 10 explained above. The leads 61 and 62 arranged on the same side of the element 60 in the case of FIG. 22, while the leads 71 and 72 are arranged on different ends of the element 70 in the connecting step to the aluminum foils in the case of FIG. 23.

In the case of FIG. 22, one lead 61 is cut shorter than the height of a metallic case 63 which contains the capacitor element therein. Then, liquid epoxy resin 64 of good moisture resistance is put on the bottom of the metallic case 63. Next, the capacitor element 60 is inserted in the metallic case 63 and is bonded with the resin to the metallic case 63 with thermal setting process. Then, the shorter lead 61 and the inside of the metallic case 63 are bonded with a conductive adhesive 65 of high heat resistance of 270° C. or more. Then, the opening of the metallic case 63 is poured with the same liquid epoxy resin 66 of good moisture resistance as used for the bonding and the resin 66 is hardened thermally for sealing. The lead 62 passing through the sealing material 66 is formed beforehand like a plate insulated from the case by an insulating member 67 in order to avoid contact with the metallic case 63.

In case of FIG. 23, a shorter lead 71 is formed as a character "L". Solder 74 having a melting point of 270° C. or more is put and melted in the bottom of the metallic case 73. Then, the capacitor element 70 is inserted in the metallic case 73 so that the L-like lead 71 is bonded with the metallic case 73 with the solder 74. Next, the opening of the metallic case 73 is sealed with epoxy resin 75 of good moisture resistance which is the same as used in the above-mentioned chip capacitor of FIG. 22. Then, the other lead 72 which penetrates the sealant material 75 is formed like a plate as a metallic terminal plate insulated from the case 73 by an insulating element 76.

Figure 24:
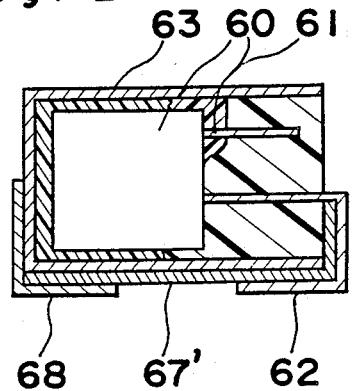
Figure 25:
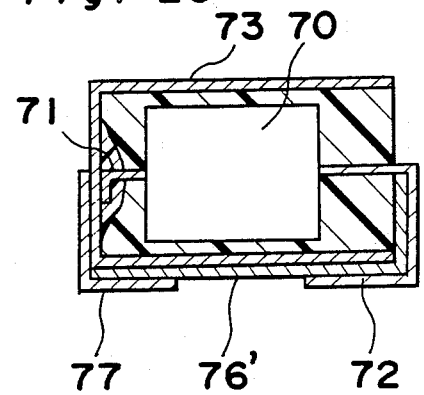

FIGS. 24 and 25 show modified examples wherein metallic terminal plates 68 and 77 are bonded to the metallic cases 63 and 73 by welding or the like and are fixed on the insulating material 67' and 76' at the bottom before inserting the capacitor element 60, 70 into the metallic case 63, 73. Both metallic terminal plates 62, 68 and 72, 77 can be set on the same plane stably.

In the examples of this embodiment, one of the leads of a capacitor element is bonded with a metallic case so that the metallic case can be used as an extension of the electrode. Thus, the resin molding is not necessary, and cheap and compact chip type capacitors can be provided.

This invention may be embodied in still other ways without departing from the spirit of essential characters thereof. The preferred embodiments described herein are therefore illustrative and not restrictive, the scope of the invention being indicated by the appended claims and all variations which come within the meaning of the claims are intended to be embraced herein.

What is claimed is:

1. An aluminum solid electrolytic capacitor, comprising:
   an anode aluminum foil having an oxide film formed on a surface thereof, a cathode aluminum foil and carbonized separators for separating said anode and cathode aluminum foils, the two foils and the separators being wound to form a capacitor element, the distance between the two foils in the capacitor element to be determined by the thickness of separator being kept at a value between ten to sixty micrometers, solid manganese nitrate electrolyte being formed between the two foils by the thermal decomposition of electrolytic solution impregnated in the capacitor element.

2. A manufacturing method of making aluminum solid electrolytic capacitor, comprising the steps of:
   winding an anode aluminum foil and a cathode aluminum foil together with carbonized separators for separating said anode and cathode aluminum foils to form a capacitor element,
   impregnating electrolytic solution of manganese nitrate in the capacitor element, and
   forming a solid electrolytic layer of manganese dioxide between the electrode foils by decomposing the electrolytic solution thermally under conditions of a temperature between 200° and 260° C. and of a time interval between 20 and 40 minutes.

3. A manufacturing method according to claim 2, further comprising a step of molding the capacitor element with resin.

4. A manufacturing method according to claim 2, further comprising a step of sealing the capacitor element in a metallic case.

5. A manufacturing method of making aluminum solid electrolytic capacitor comprising the steps of:
   winding an anode aluminum foil and a cathode aluminum foil together with separators for separating said anode and cathode aluminum foils to form a capacitor element, the anode foil having formed oxide film on the surface,
   impregnating electrolytic solution of manganese nitrate in the capacitor element to which fine powder of manganese dioxide is added, and
   forming a solid electrolytic layer between the electrode foils by decomposing the electrolytic solution thermally.

6. The amount of manganese dioxide to be added is claim 5, wherein the amount of manganese dioxide to be added is between four and six weight percent of the electrolytic solution.

7. A manufacturing method according to claim 5, further comprising a step of performing of the electrochemical conversion treatment for forming oxide film the cutting edge of the aluminum foils.

8. A manufacturing method according to claim 5, wherein said separators are Manila papers which are carbonized by heat treatment.

9. A manufacturing method according to claim 5, wherein said thermal decomposition is treated on the conditions of temperature between 200° and 260° C. and of time between 20 and 40 minutes.

10. A manufacturing method according to claim 5, further comprising a step of molding the capacitor element with resin.

11. A manufacturing method according to claim 5, further comprising a step of sealing the capacitor element in a metallic case.

12. A manufacturing method of making aluminum solid electrolytic capacitor comprising the steps of:
    winding an anode aluminum foil and a cathode aluminum foil together with separators for separating said anode and cathode aluminum foils to form a capacitor element, while keeping the distance between said aluminum foils at a value between ten to sixty micrometers,
    impregnating electrolytic solution of manganese nitrate in the capacitor element,
    forming a solid electrolytic layer between said aluminum foils by decomposing the electrolytic solution thermally, and
    doping lithium in the solid electrolytic layer.

13. A manufacturing method according to claim 12, wherein said separators are Manila papers which are carbonized by heat treatment.

14. A manufacturing method according to claim 12, wherein said thermal decomposition is treated on the conditions of temperature between 200° and 260° C. and of time between 20 and 40 minutes.

15. A manufacturing method according to claim 12, further comprising a step of molding the capacitor element with resin.

16. A manufacturing method according to claim 12, further comprising a step of sealing the capacitor element in a metallic case.

17. A manufacturing method of making aluminum solid electrolytic capacitor, comprising the steps of:
    winding an anode aluminum foil, a cathode aluminum foil together with separators for separating said anode and cathode aluminum foils to form a capacitor element, the anode foil having formed oxide film on the surface,
    impregnating electrolytic solution of manganese nitrate in the capacitor element,
    forming a solid electrolytic layer of manganese dioxide between the electrode foils by thermal decomposition of the electrolytic solution,
    performing electrochemical conversion treatment again in a weak acidic solution for restoring the deterioration of the oxide film on the aluminum foil before the completion of forming solid electrolyte, and
    forming again a manganese dioxide layer by impregnating manganese nitrate solution with carbon added in the capacitor element, and
    baking carbon on the solid electrolytic layer after impregnating carbon powder added in manganese nitrate solution of an amount much larger than that of the step of forming the manganese dioxide layer again.

18. A manufacturing method according to claim 17, further comprising a step of performing of the electrochemical conversion treatment for forming oxide film on the cutting edge of the aluminum foils.

19. A manufacturing method according to claim 17, wherein said separators are Manila papers which are carbonized by heat treatment.

20. A manufacturing method according to claim 17, wherein said thermal decomposition in the step of forming manganese dioxide first wherein said thermal decomposition is treated under conditions of a temperature between 200° and 260° C. and of a time interval between 20 and 40 minutes.

21. A manufacturing method according to claim 17, wherein said thermal decomposition in the step of forming manganese dioxide again is treated on the conditions of temperature between 200° and 260° C. and of time between 20 and 40 minutes.

22. A manufacturing method according to claim 17, further comprising a step of molding the capacitor element with resin.

23. A manufacturing method according to claim 17, further comprising a step of sealing the capacitor element in a metallic case.

24. A manufacturing method of making alumimum solid electrolytic capacitor, comprising the steps of:
   winding an anode aluminum foil, a cathode aluminum foil together with carbonized separators for separating said anode and cathode aluminum foils to form a capacitor element,
   forming a solid electrolytic layer between the electrode foils,
   putting an amount of resin for fixing the capacitor element at the bottom of a case having an opening,
   inserting the capacitor element in the case,
   fixing the capacitor element to the case with the resin, and
   sealing the opening of the case with another amount of the same resin used for fixing.

25. A manufacturing method according to claim 24, wherein the resin for fixing and the resin for sealing have good moisture resistance.

26. A manufacturing method according to claim 25, wherein the resin of good moisture resistance is epoxy resin.

27. A manufacturing method of making a chip-type aluminum solid electrolytic capacitor, comprising the steps of:
   winding an anode aluminum foil, a cathode aluminum foil together with carbonized separators for separating said anode and cathode aluminum foils to form a capacitor element, each foil having been bonded with a lead,
   forming a solid electrolytic layer between the electrode foils,
   putting the capacitor element in a metallic case having an opening,
   connecting one of the leads electrically with the inside of the metallic case with use of a binder, and
   sealing the opening of the metallic case with insulating resin.

28. A manufacturing method according to claim 27, wherein the binder is a solder.

29. A manufacturing method according to claim 27, wherein the binder is an electrically conductive binding agent.

30. A manufacturing method for making an aluminum solid electrolytic capacitor, said capacitor including an anode aluminum foil having an oxide film formed on a surface thereof, a cathode aluminum foil and separators for separating said anode and cathode aluminum foils, comprising the steps of:
   winding said anode aluminum foil and said cathode aluminum foil together with separators for separating said anode and cathode aluminum foils to form a capacitor element, the distance between the two foils in the capacitor element to be determined by the thickness of separator being kept at a value between ten to sixty micrometers,
   carbonizing said separators by heat treatment,
   impregnating electrolytic solution of manganese nitrate in the capacitor element, and
   forming a solid electrolytic layer of manganese dioxide between the electrode foils by decomposing the electrolytic solution thermally under conditions of a temperature between 200° and 260° C. and of a time interval between 20 and 40 minutes.

31. A manufacturing method according to claim 30, wherein said separators are Manila papers which are carbonized by heat treatment.

* * * * *